May 4, 1943.                M. BERMAN                2,318,189
                        VEHICLE RADIATOR SHIELD
                         Filed May 24, 1941

INVENTOR.
Morris Berman
BY
Harry C. Leents

Patented May 4, 1943

2,318,189

UNITED STATES PATENT OFFICE 2,318,189

VEHICLE RADIATOR SHIELD

Morris Berman, Chicago, Ill.

Application May 24, 1941, Serial No. 395,044

4 Claims. (Cl. 257—132)

This invention relates to vehicle radiator covers and more particularly to vehicle radiator air-flow shields, although certain features thereof may be employed with equal advantage for other purposes.

It contemplates more especially the provision of a simple, inexpensive and concealed radiator air-flow cover that can be readily suspended in position substantially in alignment with the radiator fan and behind the grille constituting the conventional automobile front that is spaced forwardly of the radiator to provide an otherwise unoccupied compartment that is readily accessible from beneath the hood. With this arrangement, the radiator cover can be stamped, cut, or otherwise shaped in an inexpensive manner from material such as waterproofed paper and the like in that the radiator grille serves as a protective guard and conceals the cover from view.

The conventional radiator cover that is applied to the exterior surface of the grille of a vehicle such as an automobile is unsightly, comparatively expensive, and subjected to abuse through contact, exposure, and handling. In order to control the air-flow through the radiator to maintain proper engine temperatures during extremely cold climatic conditions, it is only necessary to divert or regulate the primary flow caused by the fan operation and shut off a portion of the radiator area to diminish the total air flow therethrough. The use of ordinary paper including cardboard for application to the radiator surface has been resorted to by vehicle attendants, but these expedients have not proven entirely satisfactory in that the air-flow through the radiator normally causes currents which create noises by virtue of paper movement and vibration. It is not uncommon for expedients such as these to create a disturbing noise factor that renders it unsatisfactory for common use.

With the teachings of the present invention, inexpensive material such as paper has been shaped to provide a rigid air diverting device that accomplishes its desired purpose without any noise factor whatsoever during the operation of an engine and its cooling fan. To this end, paper is preferably shaped to provide a conical surface having a uniform circular base which contacts the radiator surface so that engine fan operation creates a suction effect which maintains the entire rim of the conically shaped shield to uniformly effect radiator contact and avoid disturbing air movements that causes chatter, vibration, and purring and simultaneously deflects the air due to vehicle movement away from the engine and through the louvers of the vehicle hood. During engine operation, the fan rotates so that the substantial effect thereof is to create a suction that serves to retain the shield in position rather than supplement the air flow through the radiator in conjunction with vehicle movement.

One object of the present invention is to simplify the construction and improve the operation of devices of the character mentioned.

Another object is to provide a radiator air diverting shield which is retained in effective position by the operation of the engine fan.

Still another object is to provide a relatively rigid radiator shield of substantially multi-planor shape for substantial alignment with an engine fan to divert air for temperature control.

A further object is to provide a substantially conical member of simple and inexpensive construction for application to a radiator in substantial alignment with the engine fan thereof.

A still further object is to provide a substantially conical radiator shield capable of support at its apex so that the base is in uniform contact with the radiator for confronting alignment with the engine fan thereof.

Still a further object is to provide a simple and inexpensive radiator and supporting bracket that is positioned between the radiator and its grille to regulate the air flow to the engine thereof.

Other objects and advantages will appear from the following description of an illustrative embodiment of the present invention.

Figure 1:
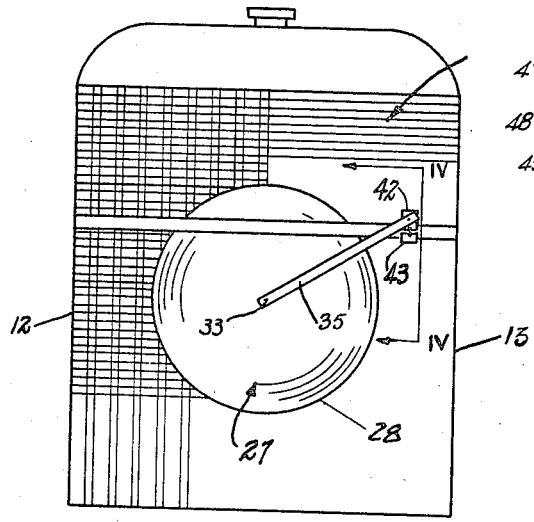
Figure 1 is a front view in elevation of an engine radiator provided with an air-flow shield embodying features of the present invention.
Figure 4:
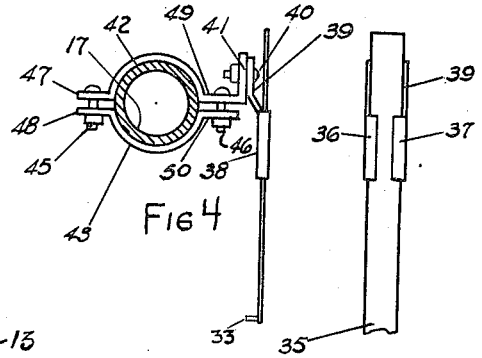
Figure 4 is a fragmentary sectional view taken substantially along line IV—IV of Figure 1 showing the airflow shield supporting bracket embodying features of the present invention.
Figure 5:
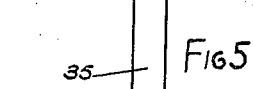
Figure 5 is an enlarged fragmentary front view in elevation of the bracket shown in Figure 4, it being broken away to clarify the showing.
Figure 2:
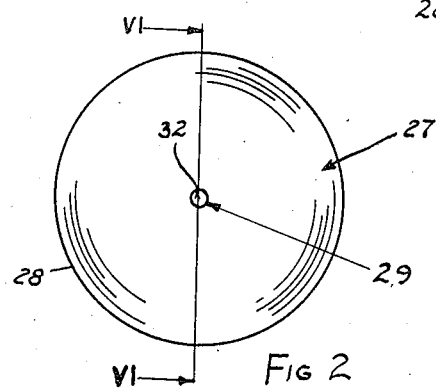
Figure 2 is a front view in elevation of an air-flow shield embodying features of the present invention.
Figure 6:
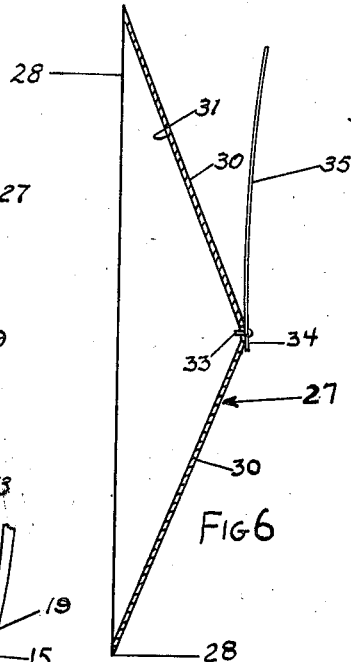
Figure 6 is a sectional view of an air-flow shield taken substantially along line VI—VI of Figure 2 with a portion of the bracket shown in operative relation therewith.

The structure selected for illustration comprises a conventional vehicle radiator 10 which is usually concealed from view in automobiles by means of an ornamental grille 11 shaped to conform with the contours of a vehicle body. The ornamental grille 11 is generally of convex configuration to embrace the sides 12 and 13 of the radiator 10 for contact with the forward side edges 14 and 15 thereof. This arrangement of the radiator 10 relative to its ornamental grille 11 presents a space 16 forwardly of the radiator 10 and rearwardly of the grille 11 for access from the top after the hood has been elevated.

A cross rod 17 bridges the sides 18 and 19 of the grille 11 in order to serve as a brace and render such more rigid. The cross rod 17 is usually within the space 16 between the radiator 10 and grille 11 and preferably though not essentially extends parallel to the radiator 10. In this position, the brace or reinforcing rod 17 is spaced forwardly of the front radiator surface 20. The foremost portion of the convex grille 11 is usually reinforced by a horizontal plate 21 which has an arcuate edge 22 shaped to conform with the interior of the grille 11 for attachment thereto. The reinforcing plate 21 is disposed in the space or compartment 16 between the radiator 10 and grille 11.

The air-flow coincident with the forward movement of the vehicle together with its radiator 10, is insufficient to sufficiently cool the water circulating through the radiator 10 during engine operation. To supplement this air flow, vehicle engines are normally supplied with a fan 23 mounted on a shaft 24 carrying a driving pulley 25 for rotation responsive to the operation of the engine to be cooled. As shown, the fan 23 is mounted directly behind the rear surface 26 of the radiator 10 and substantially in the central area thereof in order to increase the normal airflow through the radiator 10 and rearwardly against the crank case of the engine.

While this air-flow is essential to the proper performance of the engine and its maintenance of desired temperatures during normal weather, yet this increased air flow not only is superfluous but detrimental to engine operation during extremely cold weather. In order to substantially cut off the air flow through the radiator 10 and divert such from the engine immediately behind the fan 23, it has been found highly effective to provide a radiator shield directly in front of the radiator 10. This is especially effective when that portion of the radiator surface 20 conforming to the area of the fan 23 in substantial alignment therewith, is cut off or effectively shielded by contact of a cover therewith.

To this end, a conical member 27 is shaped so that its circular base rim 28 conforms substantially with or is somewhat larger than the circumference of the fan 23 for full contact with the front radiator surface 20 in direct alignment therewith. The member 27 consists, in this instance, of a conical shield which is stamped, cut or otherwise shaped from paper, cardboard, sheet material or other suitable material to provide an apex 29 for axial alignment with the fan 23 and its supporting shaft 24. The conical shield 27 presents diverging surface 30 that direct the incoming air away from the engine behind the fan 23 to escape through the side louvers of the engine hood or through other openings provided in the chassis that supports the engine.

The inward air flow created by the fan 23 serves to provide a decreased pressure area within the interior 31 of the conical shield 27 so that the base rim 28 thereof will uniformly contact and engage the front surface 20 of the radiator 10 to prevent eddy air currents, vibration or a purring effect which would otherwise result. Then, too, incoming air resulting from the forward motion of the vehicle together with its radiator 10 and ornamental grille 11, strikes the outer diverging surface 30 of the shield 27 to assist in retaining the conical shield 27 in uniform contact with the front surface 20 of the radiator 10 for deflection along the outer region thereof beyond the confines of the engine to minimize the cooling effect thereon.

This sufficiently reduces the air flow through the radiator 10 and to the engine to permit the generated heat responsive to engine operation to maintain the proper temperature for efficient operation during extremely cold weather. In order to enable the support of the shield 27 while the engine is inoperative and to assist in the support thereof during engine operation, the apex 29 of the conical shield 27 is provided with a small aperture 32 extending axially therethrough to freely receive a pin 33 mounted proximate to the extremity 34 of a metallic resilient strap 35. The resilient metallic strap 35 is, in this instance, of elongated rectangular configuration to frictionally engage confronting ears 36—37 constituting an integral part of the plate 38.

Figure 3:
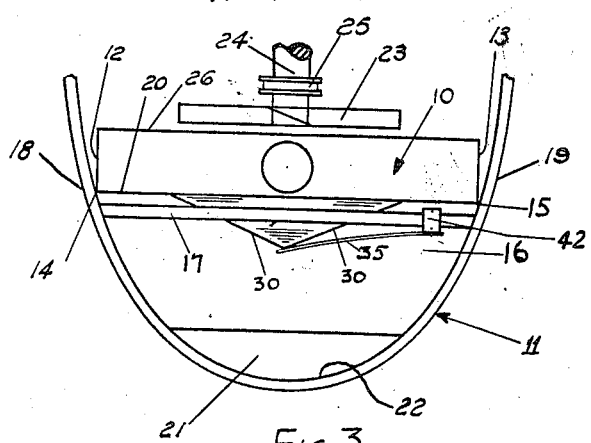
Figure 3 is a fragmentary plan view of an engine fan, radiator, and radiator grille together with an airflow shield in position in acordance with the teachings of the present invention.

The plate 38 is integrally or otherwise attached to an arm 39 which is apertured to receive a bolt 40 therethrough. The plate arm 39 confronts a bracket 41 which is apertured to receive the bolt 40 therethrough in alignment with the plate arm 39 for support therefrom in any desired relative angular position. The bracket 41 comprises, in this instance, an integral part of a substantially circular clamp 42 which is a complement of a correspondingly shaped clamp 43 intended to receive a suitable supporting element therethrough such as the pipe or rod 17 which, in this instance, braces or reinforces the radiator grill 11 (Figure 3).

Suitable fasteners such as bolts 45—46 project through confronting ears 47—48 and 49—50 provided on the confronting clamps 42—43 for engagement with the supporting pipe or rod 17. The complemental clamp members 42—43 can be moved to any position along the grille bracing rod 17 until the spring strap 35 with its pin 33 engages the shield 27 to support the latter in axial alignment with the fan 23. This positioning is rendered comparatively simple by virtue of the position adjustment rendered possible by the bolt 40 that determines the angular position of the plate arm 39 relative to the bracket 41 comprising a part of the clamp element 42.

Additionally, the spring strap 35 is displaceable in the plate 38 having its ears 36—37 spaced therefrom at a distance somewhat less than the thickness of the strap 35 so that the latter will be frictionally held in any position of engagement for adjustment purposes. With this arrangement, it will be observed that the spring strap 35 can be readily flexed forwardly from the radiator surface 20 to enable the instantaneous placement or removal of the radiator shield 27. This is advantageous in that access to the space 16 between the radiator 10 and the grille 11 affords the positioning of the radiator shield 27 therein so that its parallel base rim 28 will engage the radiator surface 20 through the urge exerted by the spring strap 35 in that the apex 29 of the shield 27 protrudes beyond the position of engagement between the spring strap 35 and its engaging plate 38. As a result, the spring strap 35 will normally be flexed forwardly to exert a rearward urge against the shield 27 in the direction of the radiator surface 20.

It should be appreciated that the material from which the shield 27 is stamped, cut or otherwise shaped is normally thin paper such as parchment, cardboard or other suitable moisture-resisting materials that are not normally self-sustaining nor form-retaining in their flat normal sheet form. For that reason as well as others noted herein including the deflection of the air flow from the engine, the shield 27 is multiplanor in configuration to render such self-sustaining and form-retaining. In this instance, the shield 27 is of conical shape, but this may be varied according to the dictates of commercial practice. With the arrangement of parts above described, it will be apparent that a very simple, effective and inexpensive radiator shield has been provided that can be readily placed in operative position or removed without entailing any appreciable time, labor or expense.

Various changes may be made in the embodiment of the invention herein specifically described without departing from the invention or sacrificing any of the advantages or features thereof, and nothing herein shall be construed as limitations upon the invention, its concept or structural embodiment as to the whole or any part thereof except as defined in the appended claims.

I claim:

1. A radiator shield comprising a conical unreinforced member composed of thin sheet material that is normally not self-sustaining or form-retaining except for its shape, a bracket supported spring strap for engaging the apex of said conical member for supporting said member adjacent the front surface of a radiator to divert the air flow beyond said conical member.

2. A radiator shield comprising a conical unreinforced member composed of thin sheet material that is normally not self-sustaining or form-retaining except for its shape, there being an aperture in the apex of said conical member, a bracket supported spring strap having a pin for engaging the apertured apex of said conical member for supporting said member adjacent the front surface of a radiator to divert the air flow beyond said conical member.

3. A radiator shield comprising a conical member composed entirely of solid air deflecting sheet material to present a peripheral rim in a common plane for contact with a radiator, and spring means for engaging the apex of said conical member to urge the full peripherial rim of said member against the front surface of a radiator to divert the air flow beyond said conical member.

4. A radiator shield comprising a conical member composed entirely of solid air deflecting sheet material to present a peripheral radiator engaging rim, there being an aperture in the apex of said conical member, and means cooperating with said apertured apex of said conical member for supporting the full peripheral rim of said member against the front surface of a radiator to divert the air flow beyond said conical member.

MORRIS BERMAN.